(12) United States Patent
Swander

(10) Patent No.: US 8,572,722 B2
(45) Date of Patent: Oct. 29, 2013

(54) FAILURE RECOGNITION

(75) Inventor: Brian D. Swander, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/342,242

(22) Filed: Jan. 3, 2012

(65) Prior Publication Data

US 2012/0110319 A1 May 3, 2012

Related U.S. Application Data

(63) Continuation of application No. 11/506,247, filed on Aug. 18, 2006, now Pat. No. 8,091,126.

(51) Int. Cl.
*H04L 29/06* (2006.01)

(52) U.S. Cl.
USPC .................................................. 726/15

(58) Field of Classification Search
None
See application file for complete search history.

(56) References Cited

U.S. PATENT DOCUMENTS

| | | | |
|---|---|---|---|
| 2005/0185644 A1* | 8/2005 | Tsuji et al. | 370/389 |
| 2005/0198691 A1* | 9/2005 | Xiang et al. | 726/3 |
| 2007/0113275 A1* | 5/2007 | Khanna et al. | 726/15 |

* cited by examiner

*Primary Examiner* — David Pearson

(57) ABSTRACT

A system and method for failure recognition is disclosed. The technology initially establishes a security association (SA) between a client and a first server on a network. In addition, an active reference count of a number of connections in the SA between the client and the first server is maintained. The SA is evaluated when the active reference count returns less than two connections within the SA between the client and the first server.

17 Claims, 7 Drawing Sheets

600

ESTABLISH A SECURITY ASSOCIATION (SA) HAVING AN ENCRYPTION PROTOCOL BETWEEN A CLIENT AND A FIRST SERVER IN A NETWORK.
610

↓

PROVIDE FROM THE FIRST SERVER A MESSAGE ENCRYPTED IN THE ENCRYPTION PROTOCOL TO AT LEAST A SECOND SERVER IN THE NETWORK, WHEREIN THE MESSAGE IS NOT REQUIRED TO BE DECRYPTED BY AT LEAST THE SECOND SERVER.
620

↓

UTILIZE THE SECOND SERVER TO MONITOR THE FIRST SERVER.
630

↓

UPON RECOGNITION OF FAILURE OF THE FIRST SERVER, THE AT LEAST THE SECOND SERVER FORWARDING THE ENCRYPTED MESSAGE TO THE CLIENT
640

600

ESTABLISH A SECURITY ASSOCIATION (SA) HAVING AN ENCRYPTION PROTOCOL BETWEEN A CLIENT AND A FIRST SERVER IN A NETWORK.
610

PROVIDE FROM THE FIRST SERVER A MESSAGE ENCRYPTED IN THE ENCRYPTION PROTOCOL TO AT LEAST A SECOND SERVER IN THE NETWORK, WHEREIN THE MESSAGE IS NOT REQUIRED TO BE DECRYPTED BY AT LEAST THE SECOND SERVER.
620

UTILIZE THE SECOND SERVER TO MONITOR THE FIRST SERVER.
630

UPON RECOGNITION OF FAILURE OF THE FIRST SERVER, THE AT LEAST THE SECOND SERVER FORWARDING THE ENCRYPTED MESSAGE TO THE CLIENT
640

FIG. 6

FAILURE RECOGNITION

CROSS-REFERENCE TO RELATED APPLICATIONS

This application is a continuation of, and claims priority to, commonly owned U.S. Pat. No. 8,091,126, filed Aug. 18, 2006, the contents of which are incorporated herein in their entirety.

BACKGROUND

Computer networks provide an efficient way to exchange information between two or more computers. Various types of computer networks are utilized including private networks, e.g., local area networks (LANs), and public networks, e.g., the Internet. Often, the information exchanged between computers is of a sensitive or confidential nature. For example, to purchase goods or services via the network, a user is required to enter payment information such as a credit card number. Similarly, users routinely transmit sensitive and confidential business information over networks.

Information is exchanged over networks according to a protocol, such as the Internet Protocol (IP). IP was designed to allow for an open exchange of information; however, standard IP was not designed to protect information from unauthorized access. Accordingly, standard IP does not prevent an unauthorized user from receiving, viewing, and even modifying information transmitted over a network. Standard IP lacks other features such as authentication of users and network devices.

To address the lack of security provided by standard IP, the Internet Engineering Task Force (IETF) has developed a set of protocols, referred to as the Internet Protocol Security (IPSec) suite. IPSec provides protocols that conform to standard IP, but that include security features lacking in standard IP. Specific examples of IPSec protocols include an authentication header (AH) protocol and encapsulating security protocol (ESP). The ESP protocol, documented mainly in IETF Request for Comments (RFC) 2406, is an authenticating and encrypting protocol that uses cryptographic mechanisms to provide integrity, source authentication, and confidentiality of data. The AH protocol, documented mainly in IETF RFC 2402, is an authentication protocol that uses a hash signature in the packet header to validate the integrity of the packet data and authenticity of the sender. RFCs 2406 and 2402 are hereby incorporated by reference in their entirety for all that they teach without exclusion of any parts thereof.

Prior to using the ESP, AH or similar protocols, a first computer and a second computer in communication over the network will negotiate a set of security parameters. The first computer begins the negotiation and is usually referred to as an initiator. The second computer is referred to as a responder because it is responding to a request from the initiator. The negotiated security parameters are stored in the initiator and the responder as one or more data structures referred to as a security association (SA). Parameters stored in the SA identify a security protocol (e.g. ESP or AH), a cryptographic algorithm used to secure communication (e.g. DES, 3DES), keys used with the cryptographic algorithm, a lifetime during which the keys are valid and the like.

One method of negotiating security parameters is by using a separate negotiation protocol. An example of a negotiation protocol is the internet key management and exchange protocol (IKE), also provided as part of IPSec and documented in IETF RFC 2409, hereby incorporated by reference in its entirety for all that it teaches without exclusion of any parts thereof. IKE is generally used to negotiate and provide authenticated cryptographic keys to be used in establishing a security association (SA) in a protected manner. As practiced today, IKE typically requires multiple messages and keys between an initiator and a responder. A first set of ephemeral Diffie-Hellman (DH) keys are exchanged to establish a confidential channel. Ephemeral keys are used a limited number of times or for a limited period of time before being discarded. A second set of information is then exchanged over the confidential channel to authenticate the parties and establish a symmetric cryptographic key. The ephemeral DH keys exchanged in existing methods are not used directly for authentication. The authentication in existing IKE implementations is mutual, in that each party authenticates the identity of the other.

The IPSec protocol is also sometimes used in Virtual Private Networks (VPNs). A VPN is a private, secured network that runs over a public, unsecured network (typically the Internet). A user connecting to a VPN typically uses a password that is used to gain access to the VPN. In some existing systems, the password is also used to compute a symmetric cryptographic key for encrypting subsequent communications between the user and the VPN. In other existing VPN systems, a group of users share a pre-determined symmetric key and password to allow authentication in IKE.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for failure recognition is disclosed. The technology initially establishes a security association (SA) between a client and a first server on a network. In addition, an active reference count of a number of connections in the SA between the client and the first server is maintained. The SA is evaluated when the active reference count returns less than two connections within the SA between the client and the first server.

DESCRIPTION OF THE DRAWINGS

The accompanying drawings, which are incorporated in and form a part of this specification, illustrate embodiments of the technology for failure recognition and, together with the description, serve to explain principles discussed below:

FIG. 6 is a flowchart of a method for informing a client device of a server failure in a secure internet protocol (IPSEC) environment in accordance with one embodiment of the present technology.

The drawings referred to in this description should be understood as not being drawn to scale except if specifically noted.

DETAILED DESCRIPTION

Reference will now be made in detail to embodiments of the present technology for failure recognition, examples of which are illustrated in the accompanying drawings. While the technology for failure recognition will be described in conjunction with various embodiments, it will be understood that they are not intended to limit the present technology for failure recognition to these embodiments. On the contrary, the presented technology for failure recognition is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for failure recognition. However, the present technology for failure recognition may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for failure recognition is also well suited to the use of other computer systems such as, for example, optical and mechanical computers. Additionally, it should be understood that in embodiments of the present technology for failure recognition, one or more of the steps can be performed manually.

Example Computer System Environment

Figure 1:
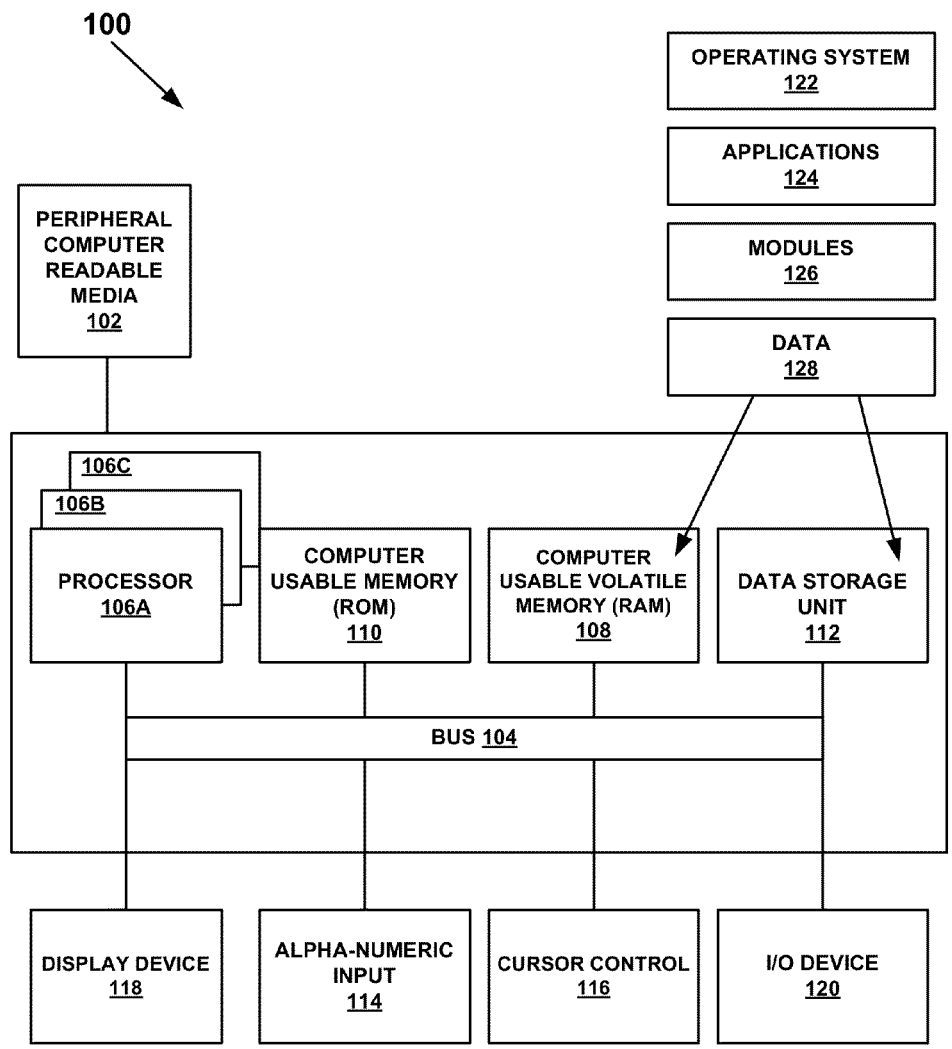
FIG. 1 is a diagram of an exemplary computer system used in accordance with embodiments of the present technology for failure recognition.

With reference now to FIG. 1, portions of the technology for failure recognition are composed of computer-readable and computer-executable instructions that reside, for example, in computer-usable media of a computer system. That is, FIG. 1 illustrates one example of a type of computer that can be used to implement embodiments, which are discussed below, of the present technology for failure recognition.

FIG. 1 illustrates an exemplary computer system 100 used in accordance with embodiments of the present technology for failure recognition. It is appreciated that system 100 of FIG. 1 is exemplary only and that the present technology for failure recognition can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multiprocessor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for failure recognition is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for failure recognition, for example, is stored as an application 124 or module 126 in memory locations within RAM 108 and memory areas within data storage unit 112.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Figure 2:
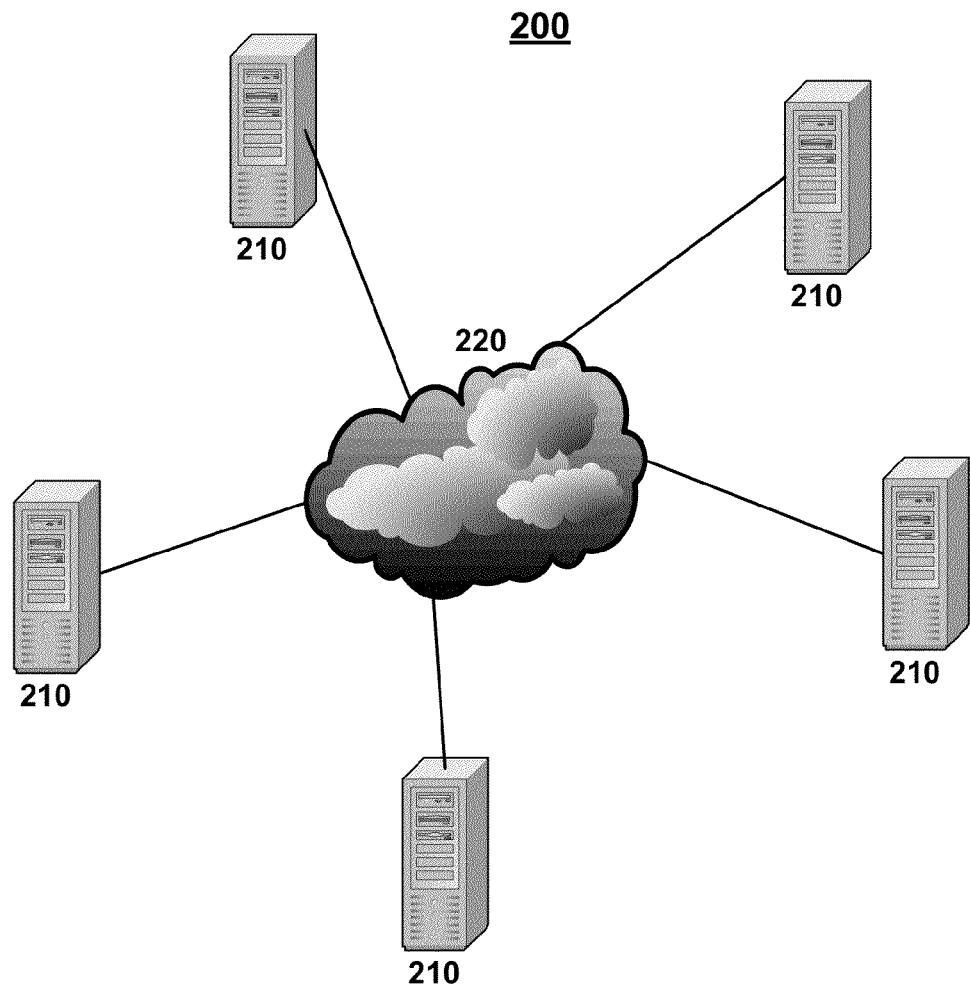
FIG. 2 is an exemplary networked environment in accordance with one embodiment of the present technology.

With reference now to FIG. 2, an exemplary networked environment 200 is shown in accordance with one embodiment of the present technology. The example network includes several computers 100 communicating with one another over a network 220, represented by a cloud. Network 220 may include many well-known components, such as routers, gateways, switches, etc. and allows the computers 100 to communicate via wired and/or wireless media. When interacting with one another over the network 220, one or more of the computers may act as clients, network servers, network load balance servers (NLBS), quarantine servers, or peers with respect to other computers. Accordingly, the various embodiments of the present technology may be practiced on clients, network servers, NLBS, quarantine servers, peers, or combinations thereof, even though specific examples contained herein may not refer to all of these types of computers.

Overview

As an overview, in one embodiment, the present technology provides a method and system for failure recognition. In general, network load balancing (NLB) load balance connections by tracking the state. However, internet protocol security (IPSec) hides this session state by encrypting all the packets. Security association (SA) methods provide a mechanism for integrating NLB and IPSec to provide load balancing without compromising IPSec. The present technology described herein monitors the connections within the SA to significantly increase failure recognition.

In one embodiment, after a security association (SA) is established between a client and a server on a network, an active reference count of the number of connections in the SA between the client and the first server is maintained. When the active reference count returns less than two connections within the SA between the client and the first server the SA is evaluated. As a result of the evaluation, pluralities of options are available.

For example, when the SA includes only a single connection, the client can initiate the failover to break the connection with the server and establish a new SA. In another embodiment, the server can break the connection with the client while informing the client to establish a new SA. In yet another embodiment, the when the SA includes only a single connection, the single connection can be evaluated for progression. If the connection is not progressing, then the client or the server can break the connection and establish a new SA. However, if the single connection is progressing, then the client and/or server can evaluate the connections progress and determine whether the connection should be broken or maintained. Although the single connection scenario is described herein, the present technology is well suited to being adjusted to any number of connections (e.g., 2, 5, 11, etc.) within the bounds of the SA as the decision number. The use of a single connection herein is merely for purposes of brevity and clarity.

Figure 3A:
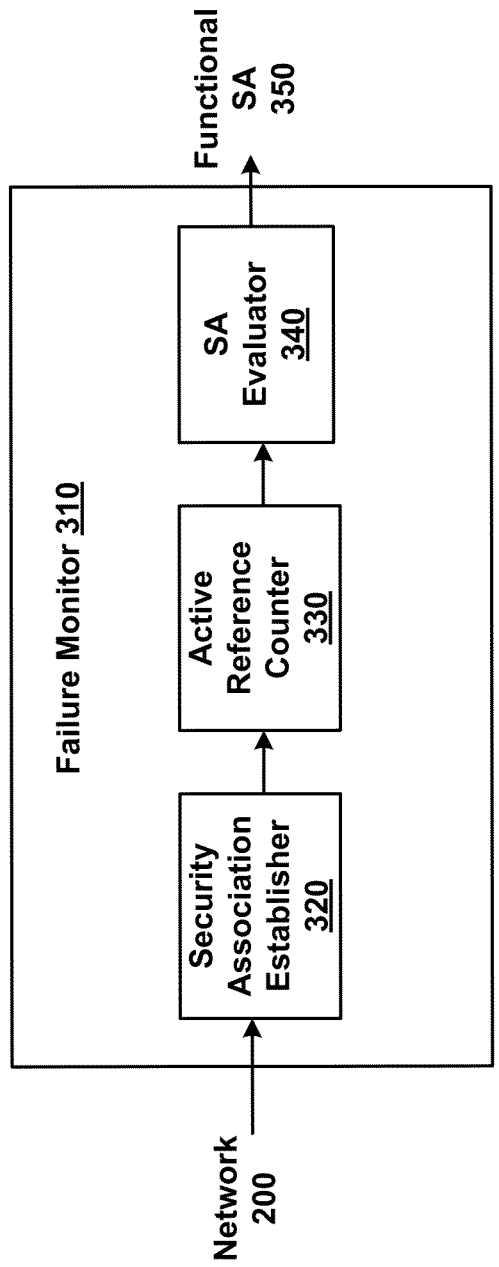
FIG. 3A is an exemplary failure monitor in accordance with one embodiment of the present technology.

With reference now to FIG. 3A, an exemplary failure monitor is shown in accordance with one embodiment of the present technology. In one embodiment, failure monitor 310 is coupled with a network 220 and is used to monitor an SA to ensure the SA is functional. In one embodiment, failure monitor 310 is a client side device. That is, the client uses the failure monitor 310 to monitor the connectivity of the SA. Thus, when a failure of the SA occurs, failure recognition time is significantly increased. In other words, the time between failure and failover is significantly decreased since the failure monitor 310 will provide earlier failure recognition for the client. In general, failover refers to the automatic switching from a first device to a second device upon recognition of first device failure. Therefore, since the client side is monitoring the connection for failure, the failure recognition on a client side of an IPSec protocol of a network load balanced connection is no longer limited to a timeout methodology.

In one embodiment, failure monitor 310 includes a security association (SA) establisher 320, an active reference counter 330 and an SA evaluator 340. In one embodiment, SA establisher 320 is used to establish a network connection between a client and a server. As is well known, the SA may include any number of actual connections. For example, an SA with 400 connections is not uncommon. In one embodiment, the server is a network load balance server (NLBS). Active reference counter 330 tracks the number of actual connections of the SA. For example, if the SA has 400 connections, then active reference counter 330 will recognize 400 connections. SA evaluator 340 is used, in one embodiment, to monitor the SA by receiving the results from active reference counter 330. Moreover, SA evaluator 340 is capable of evaluating the connections of the SA. For example, the SA evaluator 340 can evaluate a connection for progression.

Establishing an SA

Figure 3B:
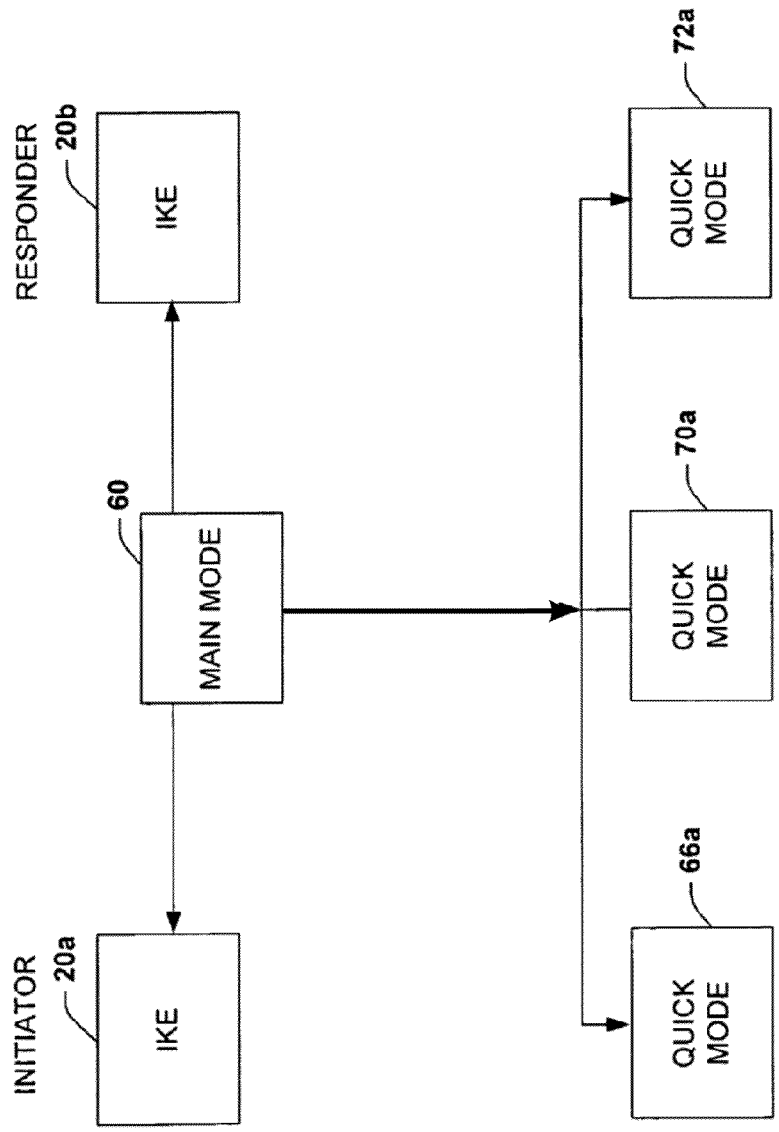
FIG. 3B is a schematic block diagram illustrating an exemplary method for using an IKE for establishing an SA in accordance with one embodiment of the present technology.

Referring now to FIG. 3B, a schematic block diagram illustrating an exemplary method for using an IKE for establishing an SA is shown in accordance with one embodiment of the present technology.

In one embodiment, an IKE module 20a and 20b is employed to establish a combination of mutually agreeable policy and keys that defines security services, protection mechanisms, and cryptographic keys between communicating peers (e.g., network system 200 depicted in FIG. 2). This combination may be referred to as a security association (SA). The SA is employed by the IPSec Driver to protect all corresponding network traffic.

To create an SA between two computers, the IETF has established a standard method of SA and key exchange resolution, which combines the Internet Security Association and Key Management Protocol (ISAKMP) and the Oakley Key Determination Protocol. This standard method is IKE and is described in the IETF standard RFC 2409.

The Oakley standard provides the Main/Quick modes as is well understood. In general, the Main Mode negotiation 60 establishes a secure channel known as the ISAKMP SA between two computers for the purpose of protecting security negotiations. To achieve this, IKE 20a authenticates computer identities and exchanges keying material to establish a shared secret key. The Main Mode (MM) 60 provides the necessary identity protection during this exchange. This enables privacy by facilitating that no identity information is sent without encryption between communicating hosts. The Quick Mode (QM) negotiation 66 establishes a secure channel between two computers for the purpose of protecting data. Because this negotiation phase involves the establishment of SA's that are negotiated on behalf of the IPSec service, the SA created in Quick Mode is referred to as an IPSec SA. During this phase, keying material is refreshed or, if necessary, new keys are generated.

After an SA has been established, IKE 20b sends the SA and the shared encryption key to the IPSec Driver for use in protecting IP network traffic. The IKE module or the IPSec Driver may initiate rekeying based on duration lifetime, byte count lifetime, and/or policy changes. The IKE module 20b performs Main Mode negotiations with a peer system to establish protection suites and keys for subsequent use in protecting Quick Mode IKE communications. Main Mode negotiation may occur in three parts: Negotiation of protection suites, A Diffie-Hellman exchange, and machine Authentication. ISAKMP payloads may be associated within messages relating to Main Mode. These payloads may be related as follows: A Security Association, a key exchange, and ID payload.

A first Security Association payload is a list of proposed protection suites for the ISAKMP SA sent by a network system initiator of the desired communications. A second Security Association payload sent in a reply message is a specific protection suite for the ISAKMP SA that is common to both IPSec network systems. It is selected by a responder network system. The Key Exchange payload may be sent in a third message by the initiator and in a fourth message by the responder and contains Diffie-Hellman key determination information for the Diffie-Hellman key exchange process. The Nonce payload contains a nonce, which is a pseudorandom number that is utilized once. The initiator and responder network systems each send their own unique nonces. Nonces are employed to provide replay protection.

When initiating an IKE exchange, the IKE module 20b proposes protection suites based on the applied security policy. Each proposed protection suite includes attributes for encryption algorithms, hash algorithms, authentication methods, and Diffie-Hellman Oakley groups. The following Table lists some exemplary protection suite attribute values that are supported by the IKE module 20a. It is to be appreciated that other attributes and values may be included.

| Attribute | Attribute Value |
|---|---|
| Encryption algorithm | DES, 3DES |
| Integrity algorithm | MD5, SHA-1 |
| Authentication method | Kerberos, preshared key, certificate |
| Diffie-Hellman group | Group 1 (768-bit), Group 2 (1024-bit) |

The initiating IKE module 20a proposes one or more protection suites in a similar order as they may appear in the applied security policy. If one of the protection suites is acceptable to the responding IKE peer 20b, the responder selects one of them for use and responds to the initiator with its choice. After a protection suite has been negotiated, the IKE module 20b generates a Diffie-Hellman public and private key pair based on the negotiated Diffie-Hellman Oakley group. The IKE module selects the first Diffie-Hellman CSP found by searching in the following order of preference by CSP type: The cryptographic strength of a Diffie-Hellman key pair is related to its prime number length (key size). The IKE specification, RFC 2409, defines three Diffie-Hellman groups with the following lengths: Group 1 is 768 bits, Group 2 is 1024 bits, and Group 5 is 1536 bits. The IKE module 20b may support a plurality of methods for authentication. For example, these methods may include Kerberos, Certificate-based digital signature, and/or Preshared key.

Upon the completion of Main Mode negotiation, described below, or the expiration of a Quick Mode SA, Quick Mode negotiation is initiated. The IKE module 20a queries the policy module to determine appropriate filter actions, including whether the link is tunnel or transport, the protocol is ESP and/or AH, and the encryption and hashing algorithms are proposed or accepted. Each successful Quick Mode SA negotiation establishes two IPSec SA's. One is inbound and the other is outbound. The following Table lists possible messages exchanged by two IPSec peers during Quick Mode negotiations 66.

| Quick Mode Message | Sender | Payload |
|---|---|---|
| 1* | Initiator | ISAKMP header, Security Association (contains proposals and secure traffic description) |
| 2* | Responder | ISAKMP header, Security Association (contains a selected proposal) |
| 3* | Initiator | ISAKMP header, Hash |
| 4* | Responder | ISAKMP header, Notification |

*ISAKMP payloads of message are encrypted.

The Quick Mode messages illustrated above are:

1. Includes a Security Association payload that contains a list of proposals and encryption and hashing algorithms for how to secure the traffic (AH vs. ESP, DES vs. 3DES, MD5 vs. SHA) and a description of the traffic that is protected. This description may include IP addresses, IP protocols, TCP ports, or UDP ports and is based on the matching filter of the initiator.

2. Includes a Security Association payload that contains the chosen method of securing the traffic.

3. Includes a Hash payload that provides verification and replay protection.

4. May be optionally included to enable synchronization between IPSec peers.

Some of the possible related filter action choices described above are listed in the following Table.

| Filter Action Choices | ESP Encryption/Integrity Algorithm | AH |
|---|---|---|
| High | DES/MD5 | None |
| Medium | None | MD5 |
| Custom | DES, 3DES, or none/MD5, SHA-1, or none | MD5 or SHA-1 |

The IKE module 20a generates session keys for both the inbound and outbound IPSec SA's based on the Main Mode shared master key and nonce material exchanged during the Quick Mode negotiations. Additionally, Diffie-Hellman key exchange material can also be exchanged and utilized to enhance the cryptographic strength of the IPSec session key.

Operation

Figure 4:
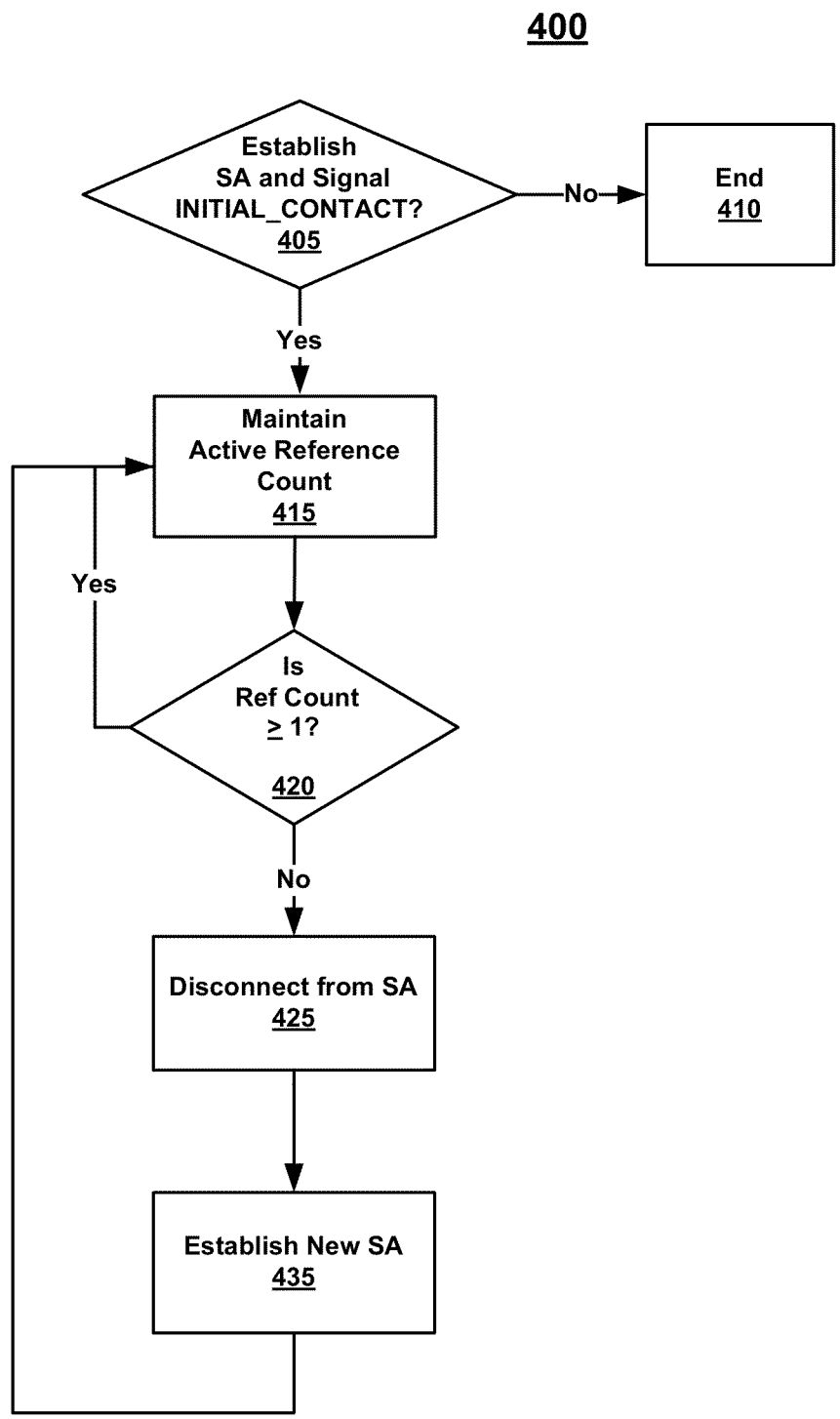
FIG. 4 is a flowchart of a networked environment with default connection failover in accordance with one embodiment of the present technology

Referring now to FIG. 4, a flowchart of a networked environment with connection reestablish parameters is shown in accordance with one embodiment of the present technology.

Referring now to 405 of FIG. 4, one embodiment decides whether to establish an SA and Signal INITIAL_CONTACT 405. If the decision is no, then the process ends 410. Otherwise, the present technology establishes an SA 405 between a client and a server and signals INITIAL_CONTACT. In one embodiment, SA 405 utilizes an IPSec protocol. In another embodiment, SA 405 is established between a client and a network load balance server using IPSec protocols.

With reference now to 415 of FIG. 4 and to FIG. 3A, one embodiment maintains an active reference count for the SA 405. For example, if the SA has 120 connections, then active reference counter 330 will recognize 120 connections. Moreover, in one embodiment, the active reference counter will continuously monitor the SA 405. In another embodiment, the active reference counter 330 will perform the active reference count after a number (e.g., 1, 3, 13, n) of packets has crossed SA 405. In yet another embodiment, the active reference counter 330 will perform the active reference count after a time period (e.g., 0.1, 1, 3, 13, n seconds) have passed.

Referring now to 420 of FIG. 4 and to FIG. 3A, one embodiment evaluates the reference count to determine if more than one connection is being used by SA 405. If more than one connection is being used by SA 405, then the process continues to maintain an active reference count 415 and continues to evaluate the reference count. However, if there are one or less connections being used by SA 405 then failover is automatically activated. That is, 425, the client disconnects from SA 405 and 435 a new SA is established. In one embodiment, the new SA is between the same client and server. However, in another embodiment, the new SA is established between the client and a different server.

For example, in the normal path, when the client has an established SA with the server, the initial contact, as described herein, has been provided and the connections flow to the server. When the old SA times out, the client will recognize the timeout and a new SA will be established, using the failover methods described herein, but will not need to provide a new initial contact.

However, in the server failure model, again after the client has an established SA with the server the initial contact has been provided and the connections flow to the server. When the server crashes, the client will utilize the heuristics to quickly realize an SA issue. The new SA will be established with a new initial contact using the failover methods described herein.

Figure 5:
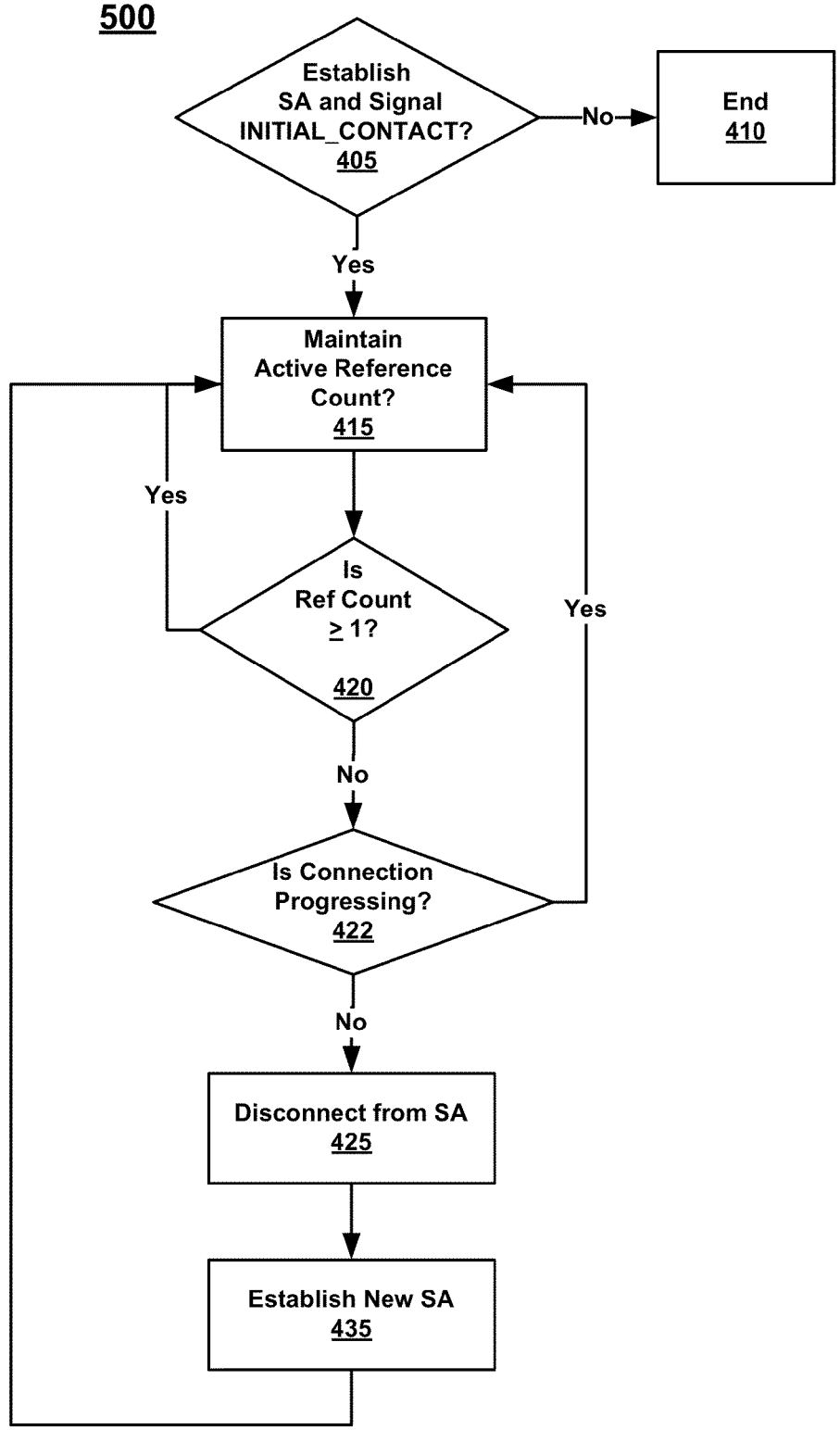
FIG. 5 is a flowchart of a networked environment with default connection evaluation in accordance with one embodiment of the present technology.

With reference now to FIG. 5, a flowchart of a networked environment with connection progress evaluation parameters is shown in accordance with one embodiment of the present technology. In general, flowchart 500 operates similar to that of flowchart 400 except for a further evaluation of the connection between 420 and 425 when a single connection is present. That is, a connection progression evaluation 522 is performed. In general, the SA evaluator 340 will evaluate the progression over the single connection to determine if the connection is progressing at an acceptable rate. For example, if the data being passed is being received at the max (or selected) rate available to the client, then the single connection is acceptable. If the connection is progressing at an acceptable rate, then the active reference count 415 is maintained and the process continues to monitor SA 405.

However, if the connection is not progressing at an acceptable rate, the automatic failover sequence is initiated. That is, 425, the client disconnects from SA 405 and 435 a new SA is established. In one embodiment, the new SA is between the same client and server. However, in another embodiment, the new SA is established between the client and a different server. Thus, in flowchart 500, an additional check is performed at 435 to see if the server is still there. For example, in one embodiment, transmission control protocol (TCP) and/or user datagram protocol (UDP) data packets themselves are used to see if the server is still there. By utilizing the TCP and/or UDP packet to check the connection, only a couple of seconds are added to the failover time. Moreover, the additional check has the benefit of not driving unneeded SA's.

In one embodiment, the present technology does not require keepalives to be sent by the application actually transferring the data. Instead, the keepalives are used as bookkeeping traffic whose purpose is to see if the peer is still alive. That is, embodiments described herein do not require keepalives, yet still derive many of the benefits of keepalives.

Trusted Notification

With reference now to FIG. 6, a flowchart 600 of a method for informing a client device of a server failure in a secure internet protocol (IPSEC) environment is shown in accordance with one embodiment of the present technology. In one embodiment, the flowchart 600 is a trusted method for informing a client of a server failure without providing any of the encryption protocols used between the client and the server, thereby restricting unauthorized security breaches.

Referring now to 610 of FIG. 6, one embodiment establishes a security association (SA) having an encryption protocol between a client and a first server in a network. In general, the SA is the same as described herein and is not repeated for purposes of brevity and clarity. For example, the SA may be a part of a network load balancing SA utilizing IPSec protocols. For example, the connection may be between a client and a network load balancing (NLB) server.

With reference now to 620 of FIG. 6 and to FIG. 2, one embodiment provides from the first server a message encrypted in the encryption protocol to at least a second server in the network, wherein the message is not required to be decrypted by at least the second server. For example, the message may be a message from the server stating that it has failed and that the client should begin the failover procedures. In one embodiment, the message is provided to only a single other server in the network environment 200. However, in another embodiment, the encrypted message may be passed to every server 210 in the network environment 200. However, even when passing the encrypted message from the first server to every server in the network, the encrypted message is not required to be decrypted by any of the other servers in the network.

With reference now to 630, one embodiment utilizes the second server to monitor the first server. For example, the second server will monitor the first server to ensure that the first server is operating correctly. That is, that the first server is not operating in a reduced capacity, is not overloaded, has not failed, and the like.

With reference now to 640, upon recognition of failure of the first server the at least the second server forwards the encrypted message to the client. The client then decrypts the encrypted message. In one embodiment, the message informs the client of the failure of the first server. Moreover, because the encryption is the same, the client may or may not know that the message came from a server other than the first server with which the SA was established. Once the message is decrypted, the client will then perform the automatic failover as described in flowcharts 400 and 500. That is, the client will perform a disconnect of the SA and establish a new SA between the client and the first server or a second server on the network.

Failover Operation

The following exemplary implementation illustrates one of the pluralities of methods for implementing failover operations after the client device has automatically selected failover. In general, the currently existing internet key exchange (IKE) vendor identification (ID) INITIAL_CONTACT will be used. The semantics of this are if a machine has no state to the peer, it will send this vendor ID in the first (SA) IKE payload. This will be analogous to a TCP SYN and allow NLB to determine that a new IPSec session is occurring.

There is no analogous "IKE FIN(ish)", other than receiving a new "IKE SYN". However, there are 2 modes of this operation described herein. First, the Non-NLB case. In general, the IKE, on getting a new request for a negotiation from the driver begins to construct its SA payload. It will then check all its SA state to determine if there are any other SA's (dead or alive) to the peer IP in question. If so, then the INITIAL_CONTACT vendor ID is not appended to this SA payload. Otherwise, we will send the INITIAL_CONTACT vendor ID. In one embodiment, the INITIAL_CONTACT vendor ID is a standard vendor ID payload as defined in IKE, and its contents include, in one embodiment, an MD5 hash of a term such as "Vid-Initial-Contact". However, in another embodiment, the payload may be defined utilizing any number of hash functions, encryption methods or terms. That is, the present technology is in no way limited to an MD5 hash of the specific term "Vid-Initial-Contact.

In the second case, the NLB case, the client's first SA negotiation to peer will be as above. That is, no state to peer will generate the INITIAL_CONTACT. When talking to the peer that is running on a NLB cluster, that peer will send back the Vendor ID: VID_NLB_PRESENT to signal to the peer that clustering is happening. When the client receives the VID_NLB_PRESENT, it will create an entry for the peer.

The following are exemplary state management changes which may occur according to one embodiment to initiate the failover procedure. In general, state is deemed successful after receiving vendor ID VID_NLB_PRESENT. The state is then monitored using the SA connection monitoring methods described in Flowcharts 400 and 500. For example, client has MM/QM to a server (e.g., NLB1) and NLB1 crashes. The failure monitor 310 will return the connection count of the SA to at or below one. If there are no connections, then the client will initiate failover. However, if there is one (or the SA has reached another pre-defined minimum number of connections), then the client will either initiate failover or check the connection(s) for progress. If there is progress, then the client may optionally maintain the SA or opt for failover initiation. Upon failover, MM is reinitiated and the NLB state cleared.

In another embodiment, Client has MM/QM to the NLB1 server and NLB1 crashes. However, the client happens to be rekeying MM when NLB1 crashes. As previously stated, the failure monitor 310 will return the connection count of the SA to at or below one. If there are no connections, then the client will initiate failover. However, if there is one (or the SA has reached another pre-defined minimum number of connections), then the client will either initiate failover or check the connection(s) for progress. If there is progress, then the client may optionally maintain the SA or opt for failover initiation. However, this MM will not have the INITIAL_CONTACT set, so this will not be treated as a new session, and dropped by the cluster. Thus, on this failure, IKE will clear the cache, and on next attempt acquire from the driver, will attempt a MM with the INITIAL_CONTACT flag set. NLB state cleared upon ANY MM negotiation failure packet formats.

The following is exemplary pseudo code for the failover process according to one embodiment of the present technology.

```
Responder cookie is 0 bytes of 0, next payload = SA.
typedef struct isakmp_hdr_ {
    unsigned char init_cookie[COOKIE_LEN];
    unsigned char resp_cookie[COOKIE_LEN];
    unsigned char next_payload;
#ifdef ISAKMP_i386
    unsigned char minver:4,
        majver:4;
#else
    unsigned char majver:4,
        minver:4;
#endif
    unsigned char exch;
#define ISAKMP_HDR_ENCR_BIT 0x0001
#define ISAKMP_HDR_COMMIT 0x0002
    unsigned char flags;
    unsigned long mess_id;
    unsigned long len;
} isakmp_hdr;
Immediately after the isakmp header is the generic_payload:
typedef struct generic_payload_ {
    unsigned char next_payload;
    unsigned char reserved;
    unsigned short payload_len;
} generic_payload;
This is followed by a hash such as the 16 byte MD5 hash of a term
Vid-Initial-Contact.
```

Thus, the present embodiments provide a method and system for failure recognition. In addition, embodiments described herein provide a method and system for failure recognition at both client side and server side. Furthermore, embodiments described herein provide a method and system for failure recognition for an NLB server in an IPSec environment without promoting security implications. Additionally, embodiments described herein provide a method and system for failure recognition which significantly reduces the time between server failure and client failover.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Instructions on a computer-usable device wherein the instructions when executed cause a computer system to perform a method for informing a client device of a server failure in a secure internet protocol (IPSEC) environment, said computer-implemented method comprising:
 establishing a security association (SA) having an encryption protocol between a client and a first server in a network;
 providing from said first server an encrypted message in said encryption protocol to at least a second server in said network, wherein said encrypted message is not required to be decrypted by at least said second server;
 utilizing said second server to monitor said first server; and
 upon recognition of failure of said first server, said at least said second server forwarding said encrypted message to said client.

2. The computer-usable device of claim 1 further comprising:
 providing said encrypted message from said first server to every server in said network, wherein said encrypted message is not required to be decrypted by every said server.

3. The computer-usable device of claim 1 further comprising:
 decrypting said encrypted message at said client, wherein said message informs said client of said failure of said first server.

4. The computer-usable device of claim 1 further comprising:
 performing a client disconnect of said SA after said client is informed of said failure of said first server; and
 establishing a new SA between said client and said first server or a second server on said network.

5. The computer-usable device of claim 4 further comprising:
 establishing said network connection in a secure internet protocol (IP) format wherein said encrypted payload is an IKE delete payload.

6. The computer-usable device of claim 1 further comprising:
 establishing said connection between a client and a network load balancing (NLB) server.

7. A computer-implemented method for failure recognition, said computer-implemented method comprising:
 establishing a security association (SA) having an encryption protocol and at least one network connection between a client and a first server in a network;
 providing from said first server an encrypted message in said encryption protocol to at least a second server in said network, wherein said encrypted message is not required to be decrypted by at least said second server;
 utilizing said second server to monitor said first server; and
 upon recognition of failure of said first server, said at least said second server forwarding said encrypted message to said client.

8. The computer-implemented method of claim 7, further comprising:
 providing said encrypted message from said first server to every server in said network, wherein said encrypted message is not required to be decrypted by every said server.

9. The computer-implemented method of claim 7, further comprising:
 decrypting said encrypted message at said client, wherein said message informs said client of said failure of said first server.

10. The computer-implemented method of claim 9, further comprising:
 performing a client disconnect of said SA after said client is informed of said failure of said first server; and
 establishing a new SA between said client and said first server or a second server on said network.

11. The computer-implemented method of claim 7, further comprising:
 establishing said network connection in a secure internet protocol (IP) format wherein said encrypted payload is an IKE delete payload.

12. The computer-implemented method of claim 11, further comprising:
 establishing said network connection between a client and a network load balancing (NLB) server.

13. An apparatus comprising:
 a memory to store computer-executable instructions;
 a processor executing the computer-executable instructions, causing the apparatus to:
 establish a security association (SA) having an encryption protocol and at least one network connection between a client and the apparatus in a network;
 provide from the apparatus an encrypted message in said encryption protocol to at least a second apparatus in said network, wherein said encrypted message is not required to be decrypted by at least said second apparatus;
 break a connection with the client when the SA includes only a single connection;
 inform the client to establish a new SA;
 receive from a third apparatus a second encrypted message wherein the second encrypted message is not required to be decrypted by the apparatus and was sent by the third apparatus to a second client;
 monitor the third apparatus; and
 upon recognition of failure of the third apparatus, forward the second encrypted message to the second client.

14. The apparatus of claim 13, the processor further to:
 provide said encrypted message from said first apparatus to every apparatus in said network, wherein said encrypted message is not required to be decrypted by every said apparatus.

15. The apparatus of claim 13, the processor further to:
 establish said network connection in a secure internet protocol (IP) format wherein said encrypted payload is an IKE delete payload.

16. The apparatus of claim 15, the processor further to:
 establish said network connection between a client and a network load balancing (NLB) server.

17. The apparatus of claim 13, wherein the second client decrypts said second encrypted message at said second client, wherein said second encrypted message informs said second client of said failure of said third apparatus, the processor further to:
 perform a client disconnect of said SA after said second client is informed of said failure of said third apparatus; and
 establish a new SA between said second client and said third apparatus or a different apparatus on said network.

* * * * *